US 12,473,981 B2

(12) United States Patent
Pedrazas

(10) Patent No.: US 12,473,981 B2
(45) Date of Patent: Nov. 18, 2025

(54) PENDULUM VALVE

(71) Applicant: Thermo Finnigan LLC, San Jose, CA (US)

(72) Inventor: Nicholas A Pedrazas, Austin, TX (US)

(73) Assignee: THERMO FINNIGAN LLC, San Jose, CA (US)

(*) Notice: Subject to any disclaimer, the term of this patent is extended or adjusted under 35 U.S.C. 154(b) by 130 days.

(21) Appl. No.: 18/345,854

(22) Filed: Jun. 30, 2023

(65) Prior Publication Data
US 2025/0003504 A1 Jan. 2, 2025

(51) Int. Cl.
F16K 3/06 (2006.01)
F16K 3/02 (2006.01)
F16K 3/314 (2006.01)
G01N 30/20 (2006.01)

(52) U.S. Cl.
CPC .............. F16K 3/06 (2013.01); F16K 3/0227 (2013.01); F16K 3/0254 (2013.01); F16K 3/314 (2013.01); G01N 2030/202 (2013.01)

(58) Field of Classification Search
CPC ..... F16K 3/06; F16K 3/10; F16K 3/18; F16K 3/184; F16K 3/186; G01N 2030/202
See application file for complete search history.

(56) References Cited

U.S. PATENT DOCUMENTS

| | | | |
|---|---|---|---|
| 1,742,828 A * | 1/1930 | Schmalz | F16K 3/10 251/192 |
| 2,516,411 A * | 7/1950 | Patterson | F22B 37/545 251/178 |
| 4,044,993 A * | 8/1977 | Wheeler | F16K 3/10 251/158 |
| 4,408,634 A | 10/1983 | Peacock | |
| 4,440,382 A | 4/1984 | Pruvot et al. | |
| 5,379,983 A * | 1/1995 | Geiser | F16K 3/316 251/197 |
| 8,950,729 B2 | 2/2015 | Geiser et al. | |
| 2016/0215892 A1* | 7/2016 | Yang | F16K 3/182 |
| 2018/0216739 A1* | 8/2018 | Ehrne | F16K 51/02 |

FOREIGN PATENT DOCUMENTS

| | | |
|---|---|---|
| CN | 212273090 U | 1/2021 |
| FR | 1324317 A | 4/1963 |
| FR | 82783 E | 4/1964 |

* cited by examiner

Primary Examiner — Reinaldo Sanchez-Medina
(74) Attorney, Agent, or Firm — Leron Vandsburger

(57) ABSTRACT

A valve can include a housing, a gate, and a traveler. The housing can include an opening such that material can flow through the opening from the first side to the second side. The gate can be moveable relative to the housing in a first direction between a first gate position and a second gate position. The gate can be moveable relative to the housing in a second direction between the second gate position and a third gate position. The gate can allow material flow through the opening in the first gate position and preventing material flow through the opening in the third gate position. The traveler can be moveable from a first traveler position to a second traveler position. The traveler can be configured to move the gate in the first and second directions as the traveler moves from the first traveler position to the second traveler position.

20 Claims, 9 Drawing Sheets

PENDULUM VALVE

TECHNICAL FIELD

This disclosure relates generally to a valve and, more particularly, to a pendulum valve.

BACKGROUND

Many analytical instruments require controlled and accurate liquid or gas flow through the instrument during analytical processing. Some of the types of analytical instruments in which precise liquid or gas flow is desired are mass spectrometers, gas-chromatography-mass-spectrometry systems (GCMS), liquid-chromatography-mass-spectrometry systems (LCMS), or other instruments that are configured to receive solid, powder, liquid and/or gas samples and to generate a characteristic signal describing one or more chemical, physical, and/or structural properties of the sample.

Analytical instruments may include a valve to temporarily isolate, or allow passage of material to, one volume from another. The material can flow through an opening in the valve. The valves can include a seal surrounding the opening and a surface that engages and disengages the seal as the valve opens and closes. Contaminants can enter the analytical instrument if the valve seal breaks down.

Some valves, such as ball valves with polytetrafluoroethylene (PTFE) seats, can apply a shear force to the seal as the valve opens and closes due to the continuous pressure applied to maintain sufficient seal engagement with the ball. Such valves can use harder seal materials, such as plastics, to withstand these shear forces. However, harder seal materials can be subject to wear over time which can lead to bits of the seal material breaking off and entering the analytical instrument through the valve. These valves are also not well suited for compact applications due to the relationship between the size of the ball component and the size of the valve passage needed for an application.

Other valve types, such as gate or pendulum valves, can have a shorter passage for a given valve opening size, and can use softer seal materials. However, softer seal materials are not ideally suited for shear forces. The gate or pendulum valves are therefore designed to avoid shear forces on the seal. These valves can first move the seal over the opening before moving the seal closed. Some gate or pendulum valves incorporate a cam, a second motor, mechanical linkage, or pneumatic action to press the seal closed after it has been moved into place. However, these designs can require multiple actuation motions or may require parts that can be more costly or complicated to manufacture. Therefore, an improved valve that is durable with compact form, reduced complexity and part count, and reduced entrainment of particulates is desired.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

A valve can include a housing, a gate, and a traveler. The housing can include a first side and a second side opposite the first side. The housing can include an opening such that material can pass through the opening from the first side to the second side. The gate can be disposed within a cavity defined by the housing. The gate can be moveable relative to the housing in a first direction between a first gate position and a second gate position. At least a portion of the gate can be moveable relative to the housing in a second direction between the second gate position and a third gate position. The second direction can be different from the first direction. The gate can allow material flow through the opening in the first gate position and preventing material flow through the opening in the third gate position. The traveler can be disposed within the cavity. The traveler can be moveable from a first traveler position to a second traveler position. The traveler can be configured to move the gate in the first and second directions as the traveler moves from the first traveler position to the second traveler position. The traveler can include an abutment surface to apply a force to an inclined surface of the gate to move the portion of the gate between the second gate position and the third gate position.

The gate can rotate about a gate axis as the gate moves in the first direction. The portion of the gate can be a gate flap coupled with a gate body and angularly displaceable relative to the gate body from a first gate flap position to a second gate flap position as the gate flap moves in the second direction. At least one of the housing and the gate can include a seal cavity and the valve can include a seal disposed at least partially within the seal cavity, the seal engaged with the housing and the gate when the gate is in the third gate position such that the seal is disposed around at least a portion of the opening. The seal can be disengaged from at least one of the gate and the housing as the gate moves from the first gate position to the second gate position. The traveler can rotate about a traveler axis as the traveler moves from the first traveler position to the second traveler position. The gate body can include a first end and a second end spaced from the first end in a lateral direction. The gate flap can extend from the gate body toward the traveler in a longitudinal direction different from the lateral direction so as to define a first angle between the gate body and the gate flap. The abutment surface of the traveler can engage the gate flap such that the gate is fixed relative to the traveler as the gate moves from the first gate position to the second gate position.

In a further embodiment, the valve includes a shaft and a seal disposed about the shaft, the seal configured to permit purging the cavity. The gate can move linearly as the gate moves from the second gate position to the third gate position. The abutment surface can apply a force to the gate flap in a force direction different from the first direction such that the gate flap moves between the second gate position and the third gate position so as to define a second angle between the gate flap and the gate body, the second angle different from the first angle.

In a further embodiment, the valve includes a shaft and an actuator rotationally fixed to the shaft. The gate can include a gate shaft opening and the shaft is disposed in the gate shaft opening such that the gate is rotatable relative to the shaft. The traveler can include a traveler shaft opening defined by a sidewall with the shaft disposed in the traveler shaft opening, at least one of the shaft and the sidewall including a protrusion and the other of the shaft and the sidewall including a recess to receive the protrusion such that the traveler is rotationally fixed to the shaft. Rotation of the actuator can rotate the traveler. The valve can include a secondary outlet configured to facilitate material movement into or from the cavity when the gate is in the third gate position. One of the gate and the housing can include an inclined surface and the other of the gate and the housing can include a contact surface such that the gate moves relative to the housing in a third direction different from the first direction in response to engagement of the contact surface and the inclined surface.

An analytical instrument can include a housing, a shaft, a gate, a traveler, an apparatus, and an actuator. The housing can define a cavity and an opening in communication with the cavity such that material can pass through the opening into or out of the cavity. The shaft can be rotatable relative to the housing. The gate can be disposed within the cavity, the gate moveable relative to the housing between a sealed position and an unsealed position, the gate allowing material passage through the opening in the unsealed position and preventing material passage through the opening in the sealed position. The traveler can be rotationally fixed to the shaft and disposed within the cavity, the traveler including a trailing end and a leading end spaced from the trailing end in a first direction, wherein the leading end engages an inclined surface of the gate as the traveler moves in the first direction from a first traveler position to a second traveler position so as to move the gate from the unsealed position to the sealed position. The apparatus can be configured to couple with the housing, the apparatus containing material such that material moves from the apparatus through the opening. The actuator can be rotationally fixed to the shaft such that the traveler moves from the first traveler position to the second traveler position in response to rotation of the actuator.

The gate can be fixed relative to the traveler in the in the first direction as the gate moves from the unsealed position toward the sealed position. One of the gate and the housing can include a protrusion and the other of the gate and the housing can include a recess such that the position of the gate is fixed relative to the housing when the protrusion is within the recess. The traveler can move relative to each of the gate and the housing when the protrusion is within the recess. The gate can include a gate body and a gate flap rotatably coupled with the gate body such that the gate flap rotates relative to the gate body from a first gate flap position to a second gate flap position as the gate moves from the unsealed position to the sealed position. The gate can include an end wall transverse to the gate body and the trailing end of the traveler includes a trailing end abutment surface that engages the end wall so as to move the gate from the sealed position to the unsealed position as the traveler moves in a second direction opposite the first direction. The analytical instrument can include a secondary outlet in fluid communication with the cavity, the secondary outlet configured to purge the cavity when the gate is in the sealed position. Rotation of the actuator can couple the apparatus to the housing and moves the gate to the unsealed position. The gate can move in a first gate direction from the unsealed position to the sealed position. One of the housing and the gate include an inclined surface and the other of the housing and the gate include an engagement surface such that the gate moves relative to the housing in a longitudinal direction different from the first gate direction as the gate moves from the unsealed position to the sealed position.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
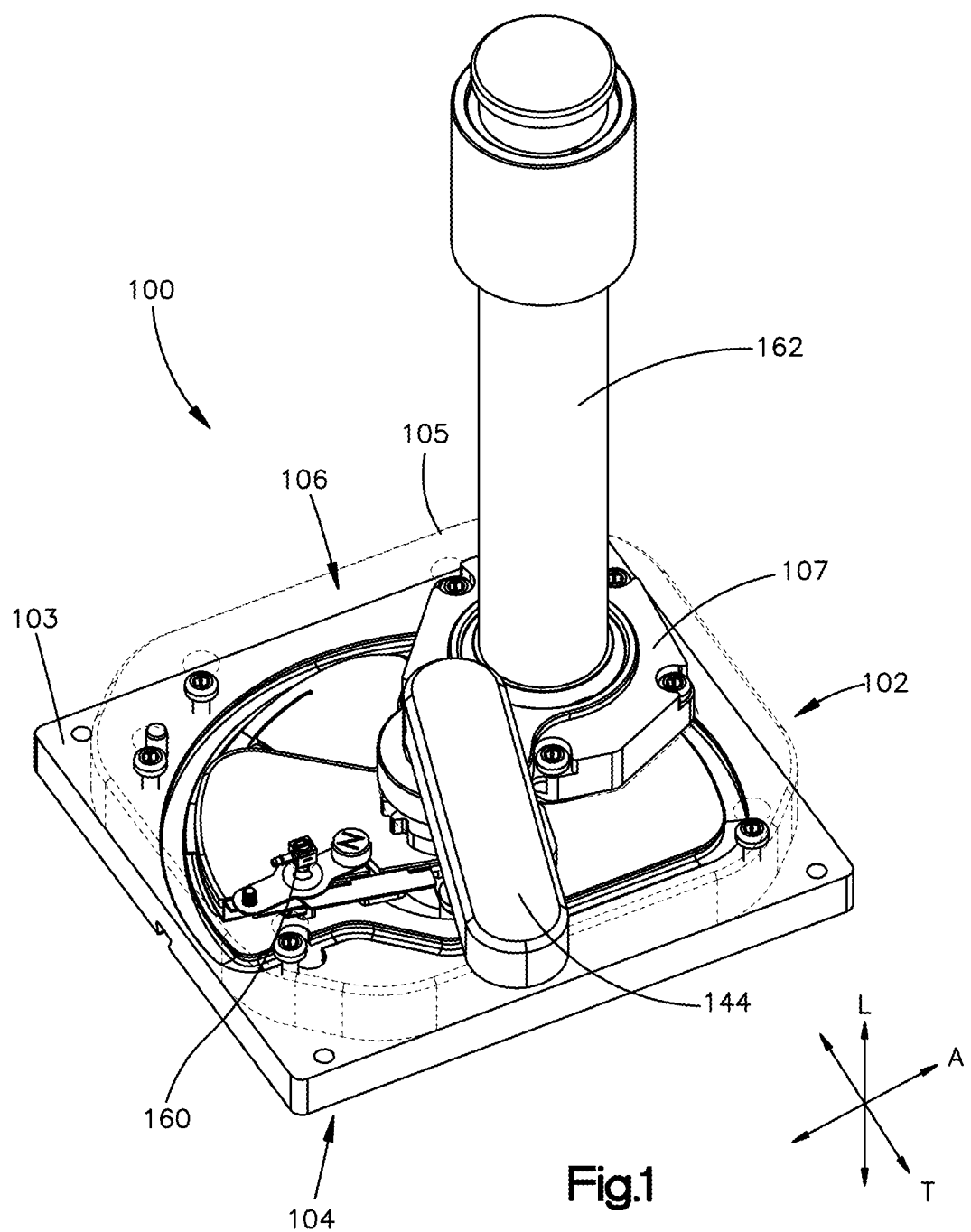
FIG. 1 is a top perspective view of an analytical instrument including a valve and an apparatus in according to an aspect of this disclosure.

Certain terminology used in this description is for convenience only and is not limiting. The words "axial", "radial", "circumferential", "outward", "inward", "upper," and "lower" designate directions in the drawings to which reference is made. As used herein, the terms "substantially" or "about" and derivatives thereof, and words of similar import, when used to describe a size, shape, orientation, distance, spatial relationship, or other parameter includes the stated size, shape, orientation, distance, spatial relationship, or other parameter, and can also include a range up to 10% more and up to 10% less than the stated parameter, including 5% more and 5% less, including 3% more and 3% less, including 1% more and 1% less. All ranges disclosed herein are inclusive of the recited endpoint and independently combinable. The terminology includes the above-listed words, derivatives thereof and words of similar import.

An analytical instrument can include a valve that prevents material passage between internal and or external regions. The analytical instrument can be a mass spectrometer, gas-chromatography-mass-spectrometry system (GCMS), liquid-chromatography-mass-spectrometry system (LCMS), or other instrument that is configured to receive solid, powder, liquid and/or gas samples and to generate a characteristic signal describing one or more chemical, physical, and/or structural properties of the sample. The valve can isolate a first side from a second side when the valve is closed. The valve can be opened to allow material to transfer through an opening in a housing between the input and the output. The valve can include a gate that seals an opening in a sealed position and allows material passage in an unsealed position. A seal can be positioned about the opening such that the seal is sealingly engaged with the gate and the housing when the valve gate is in the sealed position. At least one of the gate and the housing disengage from the seal as the gate moves from the sealed position to the unsealed position. A valve that applies a shear force to the seal can result in excessive wear to the seal. The valve described herein can minimize or avoid any shear forces applied to the seal to prolong the useful life of the seal and reduce or eliminate entrainment of seal material through the cavity into the analytical instrument. The gate can be sequentially moveable in a first direction and a second direction different from the first direction so as to avoid excess wear on a seal when moving between the unsealed and sealed positions. The valve described herein can minimize or avoid any shear forces applied to the seal while having a compact form perpendicular to the valve opening and a low part count for economic construction. The valve described herein can employ a single actuation motion to move a gate over an opening and moving the gate into sealing engagement to close the valve. The valve described herein ensures correct placement and compression of the gate and a seal without requiring secondary actuators.

Existing valves can allow material to remain within the cavity after the valve is closed. That remaining material can pass through the opening when the valve is reopened. This can be undesirable when different materials are being introduced into the cavity during a subsequent use of the valve. The valve 100 described herein can be configured to purge material out of the cavity before use. The valve 100 can be purged to reduce pressure within the cavity. The pressure within the cavity can be equalized with the pressure within a component with which the valve 100 is coupled.

The valve can include an actuator that moves the gate between the sealed and unsealed positions. In some examples, the actuator also locks an apparatus or tool to a housing. The actuator can lock the apparatus to the housing and move the gate in a single motion. The actuator can lock the apparatus to the housing, activate the secondary outlet, and move the gate in a single motion. Existing valves can require a user to secure a sample container thereto and then open the valve after the securing step. The valve described herein can lock the apparatus to the housing and open the valve in a single step.

Referring to FIG. 1, a valve 100 is shown. The valve 100 can include a housing 102 having a first side 104 and a second side 106. The first side 104 can be opposite the second side 106 in a longitudinal direction L. The housing 102 can include first and second edges opposite each other in a lateral direction A. The lateral direction A can be perpendicular to the longitudinal direction L. The housing 102 can include first and second ends opposite each other in a transverse direction T. The transverse direction T can be perpendicular to each of the lateral and longitudinal directions A, L. The housing 102 can have a generally rectangular shape as shown in FIG. 1. In other examples, the housing 102 can be circular, semi-circular, triangular, oval, or pentagonal. In some examples, the housing 102 includes a first housing member 103 and a second housing member 105. In other examples, the housing 102 is a monolithic construct. The first housing member 103 can be disposed on the first side 104 of the housing 102. The second housing member 105 can be disposed on the second side 106 of the housing 102. The first and second members 103, 105 can define an internal cavity. The cavity can be configured to receive elements of the valve 100.

Figure 2:
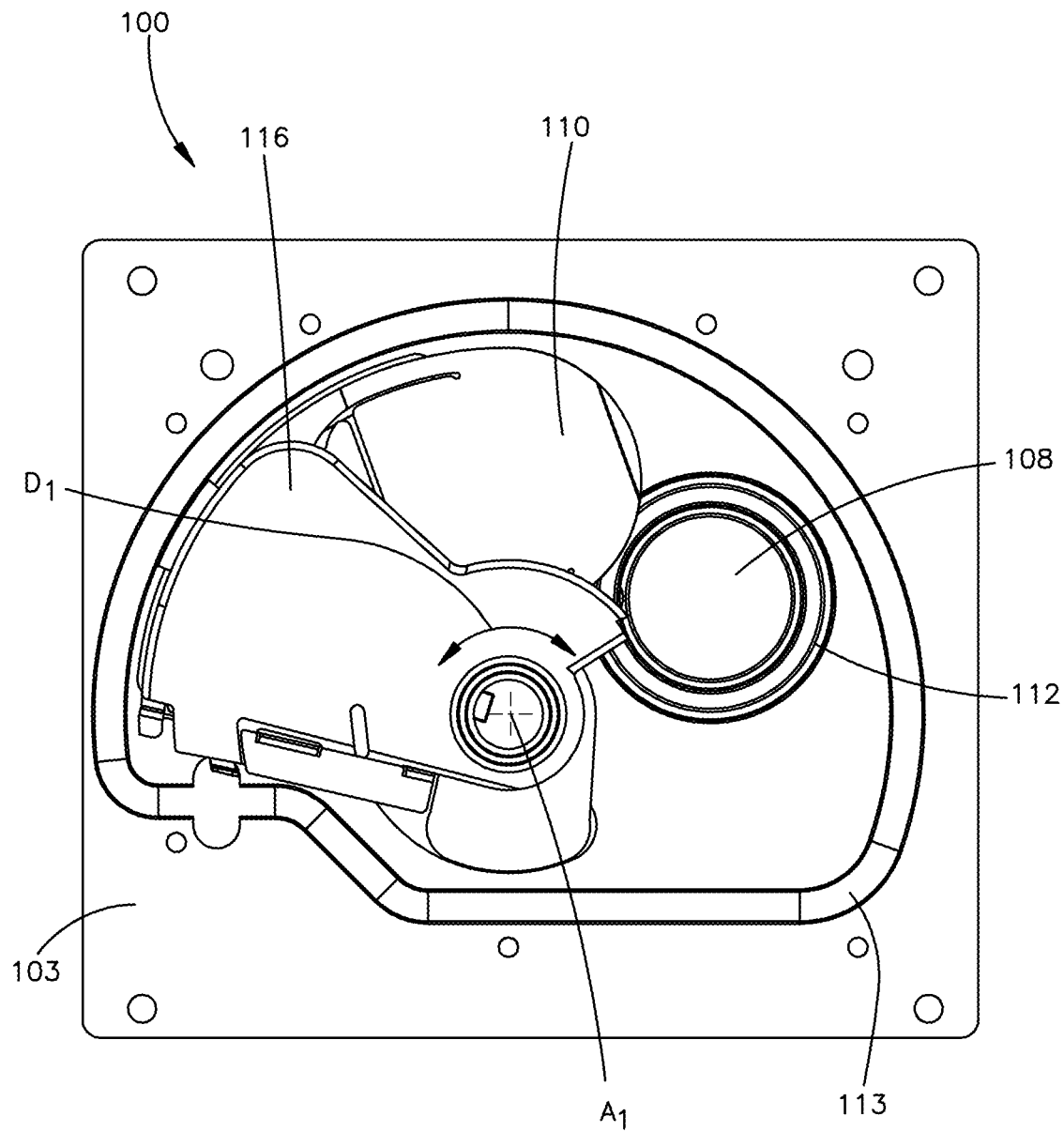
FIG. 2 is a top plan view of a portion of a first housing member, a traveler, and a gate of FIG. 1 with the traveler and the gate in their respective first positions.

The valve 100 can include a sealing element to form a fluid tight seal between the first and second housing members 103, 105. Referring to FIG. 2, the first housing member 103 can include a recess 113 configured to receive the sealing element. In other examples, the second housing member 105 can include the recess 113. In still other examples, each of the first and second housing members 103, 105 can include the recess 113. The sealing element can be an o-ring, a gasket, a foam, a hardening (for example, epoxy) or non-hardening (for example, silicone) joining or sealing material, a compressed metal-to-metal interface, a weld, a braze, and or other common joining and sealing methods.

Referring to FIG. 2, an opening 108 can extend through the housing 102. The opening 108 can extend through the first housing member 103. The opening 108 can extend through the second housing member 105. The opening 108 has a circular shape in FIG. 2. In other examples, the opening 108 can have a triangular, rectangular, pentagonal, or other polygonal shape. The opening 108 can have an irregular shape. Material can pass through the opening 108 when the valve 100 is in an unsealed configuration. The material can be gas, liquid, or solid (e.g., pure gas, gas mixture, liquid, powder, etc.). The material can be a combination of two or more of a gas, liquid, and solid (e.g., a suspension, colloid, etc.). The opening 108 can allow material to pass through the valve 100 from a high pressure receptacle to a low pressure receptacle. In an illustrative example, an analytical instrument can include a relative negative pressure region that is reversibly sealed from an ambient environment by the valve 100. In this way, the material can be contained within a vessel or tool at about ambient pressure (e.g., a higher pressure region), and can be introduced into the analytical instrument by pressure-driven flow.

Figure 3:
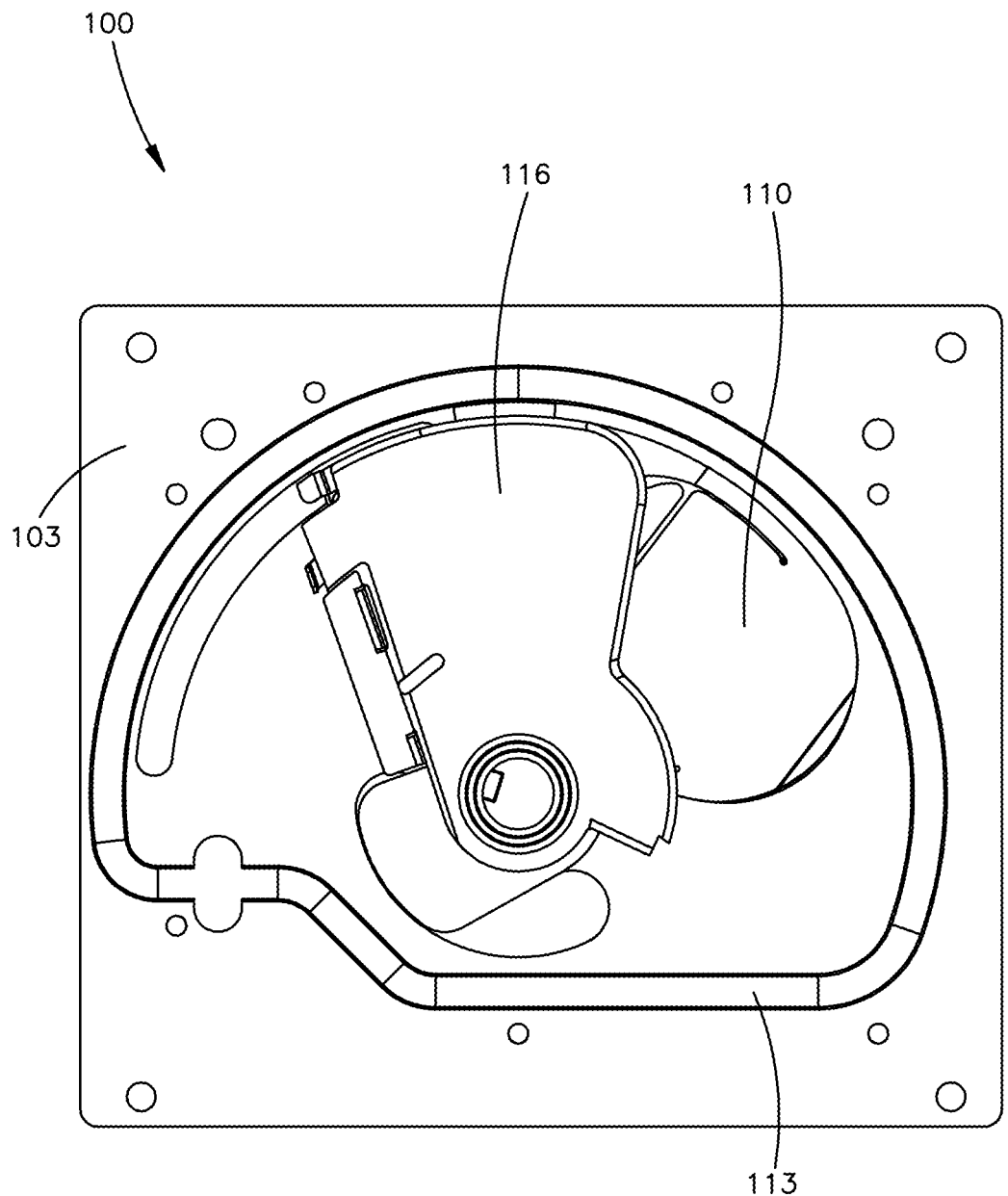
FIG. 3 is a top plan view of the first housing member, the traveler, and the gate of FIG. 1 with the gate in a second gate position.
Figure 4:
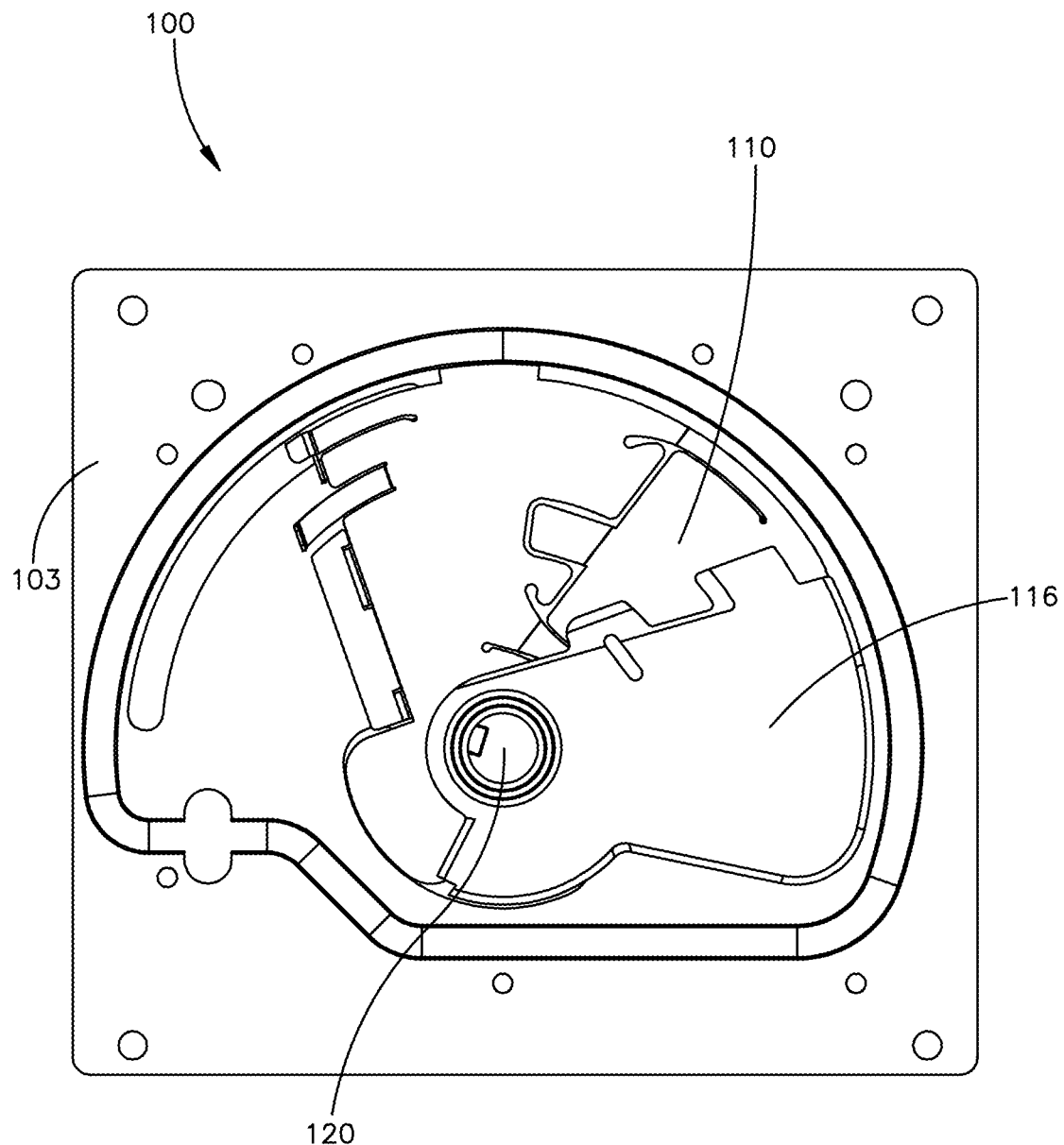
FIG. 4 is a top perspective view of the first housing member, the traveler, and the gate of FIG. 1 with the gate in a third gate position and the traveler in a second traveler position.

The valve 100 can include a gate 110 that can prevent material passage through the opening 108. The gate 110 can allow material flow through the opening 108 in a first gate position (FIG. 2). The gate 110 can move from the first gate position (FIG. 3) to a second gate position (FIG. 3) to a third gate position (FIG. 4). The gate can prevent material flow through the opening 108 in the third gate position. The valve 100 can be in the unsealed configuration when the gate 110 is in the first gate position. The valve 100 can be in the sealed configuration when the gate is in the third gate position.

Figure 5:
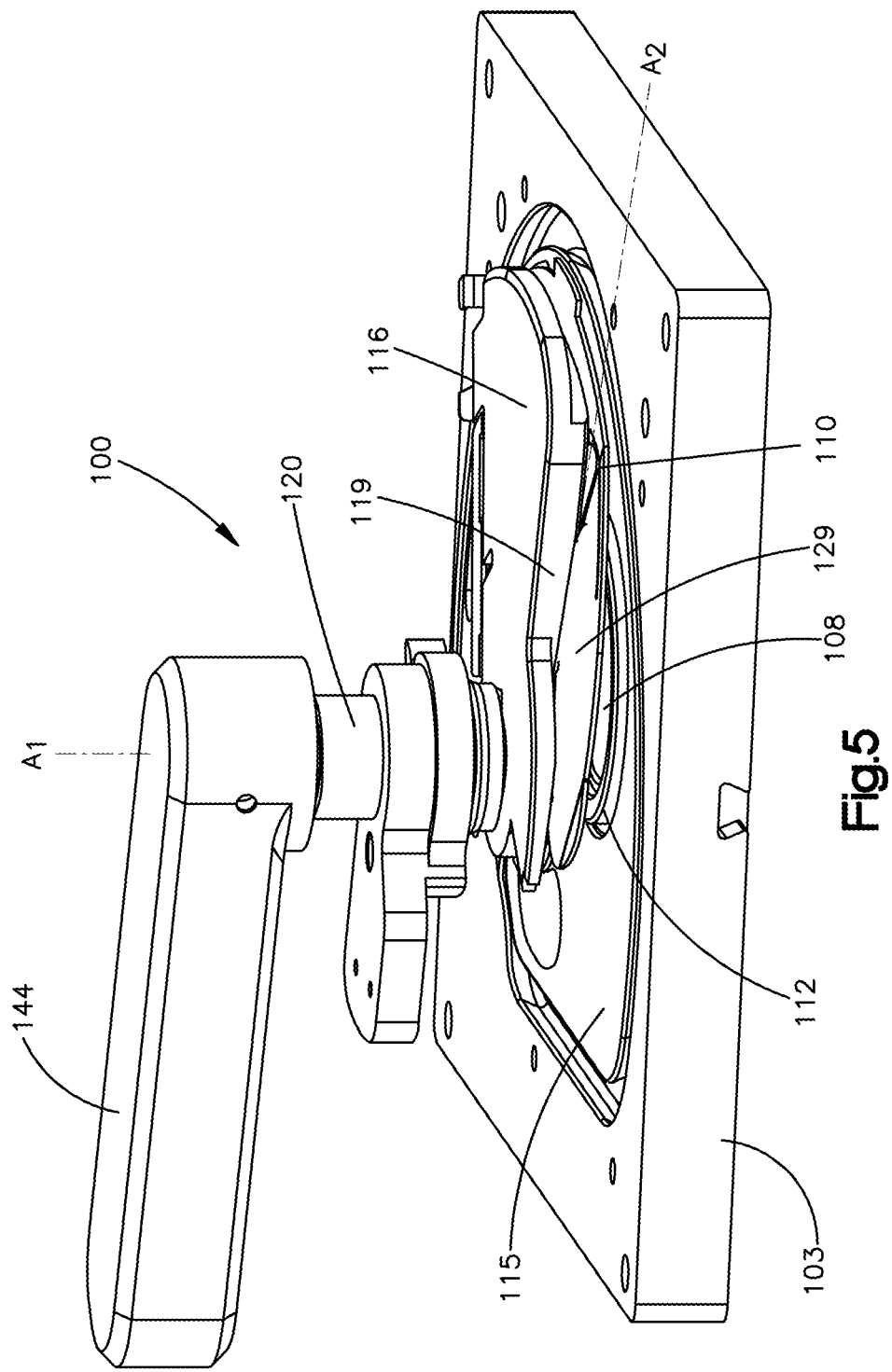
FIG. 5 is a top perspective view of an actuator, first housing member, the traveler, and the gate of FIG. 1 with the gate in the second gate position and the traveler between the first traveler position and the second traveler position.
Figure 6:
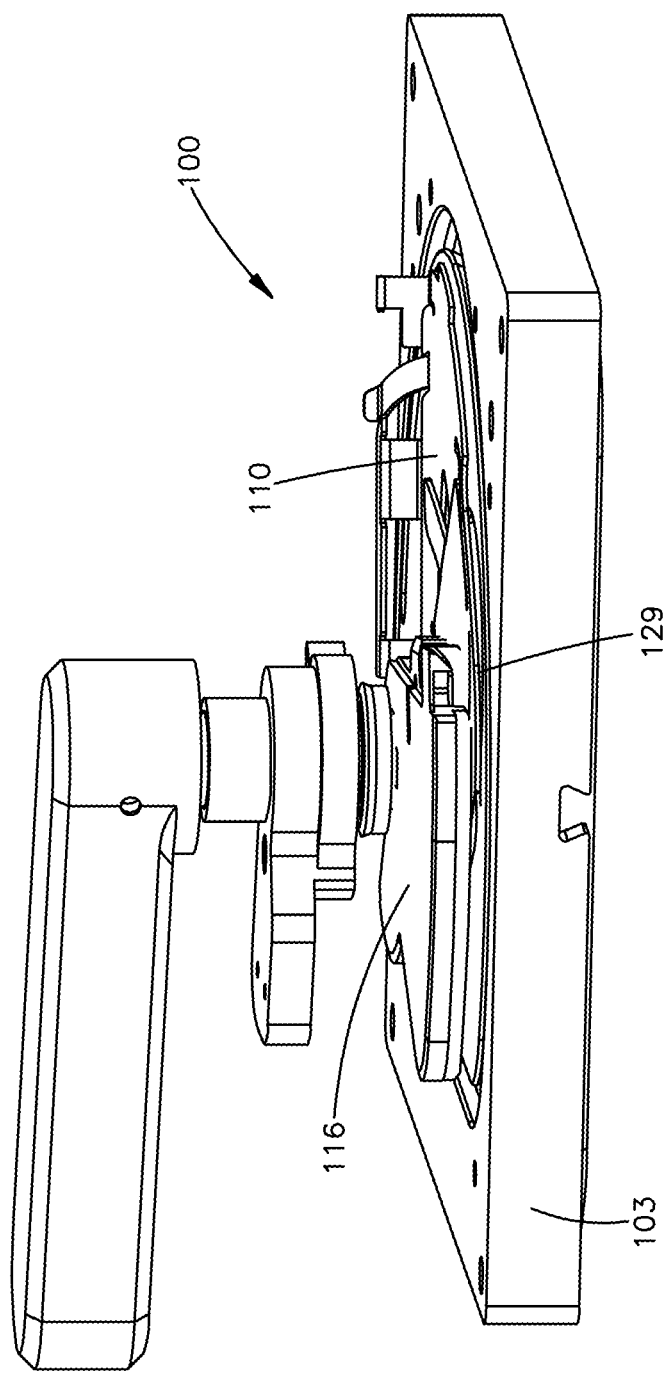
FIG. 6 is a top perspective view of the actuator, first housing member, the traveler, and the gate of FIG. 1 with the gate in the third gate position and the traveler in the second traveler position.

The gate 110 can move in a first gate direction as the gate 110 moves from the first gate position to the second gate position. The gate 110 can pivot about a gate axis as the gate 110 moves from the first gate position to the second position. In some examples, the gate 110 rotates about a first axis $A_1$ (FIG. 2) as the gate 110 moves from the first gate position to the second gate position. The first axis $A_1$ can be a gate pivot axis. The first axis $A_1$ can be elongate in the longitudinal direction L. In other examples, the gate 110 can move linearly between the first and second gate positions. The first gate direction can be along direction $D_1$ in FIG. 2. In other examples, the gate 110 can move linearly between the first and second gate positions. At least a portion of the gate 110 can move in a second gate direction between the second gate position (FIG. 5) and a third gate position (FIG. 6). The second gate direction can include movement in the longitudinal direction L. The second gate direction can be parallel to the longitudinal direction L. The first gate direction can be different from the second gate direction. The second gate direction can be transverse to the first gate direction. The valve 100 can transition from the unsealed configuration to the sealed configuration as the gate moves from the first gate position to the third gate position.

The gate 110 can interact with the housing 102 to disengage the gate 110 from the traveler 116. The gate 110 can interact with the housing 102 as the gate 110 moves to the second gate position. For example, one of the gate 110 and the housing 102 can include a ramped surface and the other of the gate 110 and the housing can include an engagement surface such that the gate 110 moves in the second gate direction as at least one of the ramped surface and engagement surface moves relative to the other of the ramped surface and the engagement surface.

Figure 7:
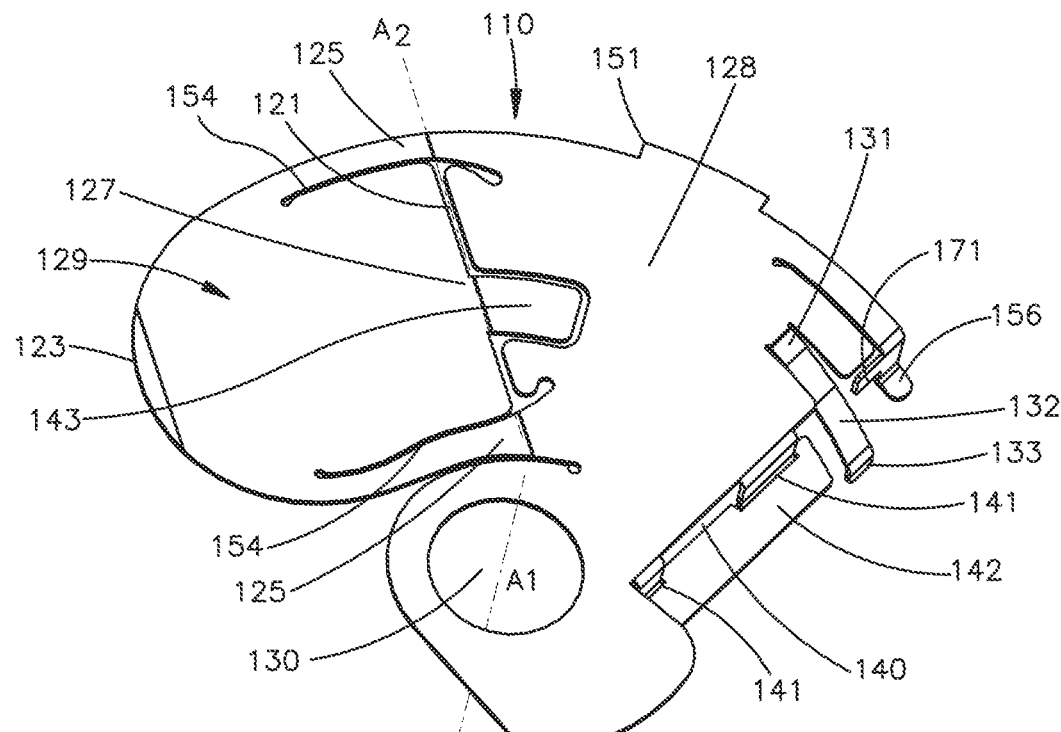
FIG. 7 is a bottom perspective view of the gate of FIG. 1.

Referring to FIG. 7, the gate 110 can include a body 128 and a flap 129. The flap 129 can be configured to seal the opening 108. In some examples, the flap 129 has a semicircular shape. In other examples, the flap 129 can have a rectangular, triangular, trapezoidal, or other polygonal shape. The flap 129 can have a surface area larger than a surface area of the opening 108.

The flap 129 can include a first end 121 and a second end 123 spaced from the first end. The first end 121 can be coupled with the body 128. The second end 123 can be a free end. The flap 129 can be movable relative to the body 128. The flap 129 can be angularly displaceable relative to the body 128. The flap 129 be pivotable relative to the body 128 about a second gate axis $A_2$. In some examples, the flap 129 pivots relative to the body 128 about the second gate axis $A_2$ as the gate 110 moves between the second and third gate positions. In other examples, the flap 129 moves approximately linearly between the second and third gate positions. In other examples, the flap 129 and the body 128 are fixed relative to each other and both the flap 129 and the body 128 move as the gate 110 moves from between the second and third gate positions. For example, the flap 129 and the body 128 could both move in the longitudinal direction L as the gate 110 moves between the second and third gate positions.

The body 128 can include a first end and a second end spaced from the first end in the first gate direction. The flap 129 can be coupled with the body 128. The flap 129 can be coupled with the first end of the body 128. The flap 129 and the body 128 can be a monolithic construct. In some examples, the flap 129 and body 128 are manufactured from a flexible material such that the flap 129 is pivotable relative to the body 128 without plastically deforming the flap 129 or body 128. In other examples, the flap 129 and the body 128 are separate elements coupled by a hinge.

The flap 129 can include one or more first portions 125 coupled with the body 128. The first portion 125 can be a connecting element. The first portion 125 can be a bridging structure. The first portion 125 can be connected to the body 128. The first portion 125 can be connected to an intermediate portion between the flap 129 and the body 128. The first portion 125 can be coupled with a hinge that is coupled with the body 128. The flap 129 can be coupled with the body 128 by the one or more first portions 125.

The flap 129 can include a second portion 127. The second portion 127 can be spaced from the body 128. The second portion 127 can be spaced from the body 128 by a relief. The relief can extend along a portion of the first end 121 of the flap 129. In some examples, the relief is a portion that has a reduced thickness compared to the flap 129 and the body 128. In other examples, the relief is a space such that the second portion 127 is not connected to the body 128. In other examples, the second portion 127 is connected to the body 128 along the length of the intersection of the second portion 127 and the body 128.

In some examples, one of the first and second portions 125, 127 are movable relative to the other of the first and second portion 125, 127. An intermediate portion 154 can be positioned between the first portion 125 and the second portion 127. The intermediate portion 154 can be a relief cut that extends through the flap 129. In other examples, the intermediate portion 154 is configured to expand and contract such that one of the first and second portions 125, 127 are movable relative to the other of the first and second portion 125, 127. In other examples, the intermediate portion 154 has a smaller thickness than the first and second portions 125, 127. The first and second portions 125, 127 can each be movable relative to the body 128.

The flap 129 can be movable from a first configuration (FIG. 5) to a second configuration (FIG. 6). The flap 129 can be biased toward the first configuration. The flap 129 can pivot from the first configuration to the second configuration. Movement of the flap 129 from the first configuration to the second configuration can transition the gate 110 from the second gate position to the third gate position. The flap 129 can extend from the first end of the body 128 away from the first housing member 103 in the first configuration. The flap 129 can be disposed at a first angle relative to the body 128 in the first configuration. The flap 129 can be disposed at a second angle relative to the body 128 in the second configuration. The first angle can be less than the second angle. For example, the second angle can be closer to 180 degrees than the first angle. In other examples, the flap 129 is disposed at a fixed angle relative to the body 128 and the gate 110 moves in the second gate direction as the gate 110 moves between the second and third gate positions.

In some examples, the gate 110 moves sequentially in the first and second gate directions as the gate 110 moves between the first and third gate positions. The flap 129 can be fixed in the second gate direction as the gate 110 moves in the first gate direction. The body 128 of the gate 110 can be fixed in the first gate direction as the flap 129 moves in the second gate direction. In some examples, the flap 129 is fixed in the second gate direction during an initial movement of the gate 110 in the first gate direction, then the flap 129 moves in the second gate direction. In other examples, the flap 129 moves in the first and second gate directions simultaneously.

The gate 110 can pivot about the first axis $A_1$ as the gate 110 moves from the first gate position to the second gate position and the flap 129 pivots about the second axis $A_2$ from the second gate position to the third gate position. In other examples, the gate 110 can pivot about the first axis $A_1$ as the gate moves from the first gate position to the second gate position and the flap 129 moves linearly from the second gate position to the third gate position. In still other examples, the gate 110 can move linearly as the gate moves from the first gate position to the second gate position and the flap 129 rotates about the second axis $A_2$ from the second gate position to the third gate position.

A fluid tight seal can be established between the gate 110 and the housing 102 as the flap 129 moves from the second gate position to the third gate position. A seal 112 can be coupled with the housing 102 and the gate 110 when the flap 129 is in the third gate position to establish a vacuum or fluid tight seal. One example of a seal 112 is shown in FIG. 2. The seal 112 can be an O-ring. The seal 112 can be made from a flexible material. The seal 112 can be a solid or foam, synthetic or natural rubber, or plastic, or a combination thereof (for example, Buna-N, EPDM, FEPM, FKM, FFKM, fluroelastomer, fluoropolymer, fluorosilicone, neoprene, polypropylene, polyurethane, PTFE, silicone, TFE/P). The seal 112 can be an independent part from, bonded to, held mechanically to, and or a coating on, the housing 102 or flap 129. The scaling surfaces on the housing 102 and flap 129 can have specific surface preparations (for example, grinding, mechanical polishing, plating, electro-polishing) to obtain sufficient surface flatness and minimal surface roughness needed to effectively seal. The seal 112 can be configured to flex into sealing engagement with each of the housing 102 and the gate 110 as the gate 110 moves from the second gate position to the third gate position. In some examples, the seal 112 is fixed to the housing 102. In other examples, the seal 112 is fixed to the flap 129. In other examples, a seal 112 is fixed to the housing 102 and a seal 112 is fixed to the flap 129. The housing 102 can include a seal cavity configured to receive at least a portion of the seal 112. The seal cavity can extend from an interior surface toward an exterior surface of the first housing member 103.

The flap 129 can move into engagement with the seal 112 as the flap 129 moves in the second gate direction. The second gate direction can be substantially perpendicular to an upper surface of the first housing member 103. The upper surface can be the surface that confronts the second housing member 105. The flap 129 can apply a substantially compressive force to the seal 112 when the second gate direction is substantially perpendicular to the upper surface. The second direction being substantially perpendicular to the upper surface can avoid shearing forces being applied to the seal 112 by the gate 110 and the housing 102. The useful life of the seal 112 can be prolonged by minimizing or avoiding shear forces on the seal 112. The second direction being substantially perpendicular to the first side 104 can reduce friction on the seal 112 from the flap 129.

Referring to FIG. 2, the valve 100 can include a traveler 116 configured to move the gate 110 between the first and second gate positions. The flap 129 can interact with the traveler 116 to move the flap 129 between the first and second configurations. The traveler 116 can interact with the flap 129 to move the gate 110 from the second gate position to the third gate position. One of the flap 129 and the traveler 116 can define an inclined surface engageable by the other of the flap 129 and the traveler 116. In some examples, the traveler 116 can apply a force to the inclined surface of the flap 129 to move the flap 129 in the second gate direction. In other examples, the traveler 116 expands to move the flap 129 in the second gate direction.

The traveler 116 can be configured to move from a first traveler position (FIG. 2) to a second traveler position (FIG. 4). The traveler 116 can move in a first traveler direction as the traveler 116 moves from the first traveler position to the second traveler position. The first traveler direction can be along the direction $D_1$ (FIG. 2). The traveler 116 can pivot about a traveler axis as the traveler 116 moves from the first traveler position to the second traveler position. In other examples, the traveler 116 can move along a linear axis. The traveler axis can be parallel to the gate axis. The traveler axis and the gate axis can be colinear. The traveler axis and the gate axis can be the same axis. The traveler 116 can pivot about the first axis $A_1$ as the traveler 116 moves between the first and second traveler positions.

The traveler 116 and the gate 110 can simultaneously move in the first traveler direction and the first gate direction, respectively. The first gate direction and the first traveler direction can be the same direction. The position of the gate 110 can be fixed relative to the traveler 116 as the gate 110 moves between the first and second gate positions.

The gate 110 can be positioned between the traveler 116 and the first housing member 103. The gate 110 can be positioned between the traveler 116 and the first housing member 103 in the longitudinal direction L. The traveler 116 can be positioned between the second housing member 105 and the gate 110. At least a portion of the gate 110 can be disposed in the path of the traveler 116 such that the traveler 116 contacts the gate 110 as the traveler 116 moves from the first traveler position to the second traveler position. For example, a distance between the second end 123 of the flap 129 and the second housing member 105 can be less than a height of the traveler 116 such that at least a portion of the flap 129 is disposed in the path of the traveler 116.

The traveler 116 can be configured to couple with a shaft 120. The shaft 120 can extend through a portion of the housing 102. A seal can be disposed about the shaft 120. The seal can sealingly engage the shaft 120 and the housing 102.

Figure 8:
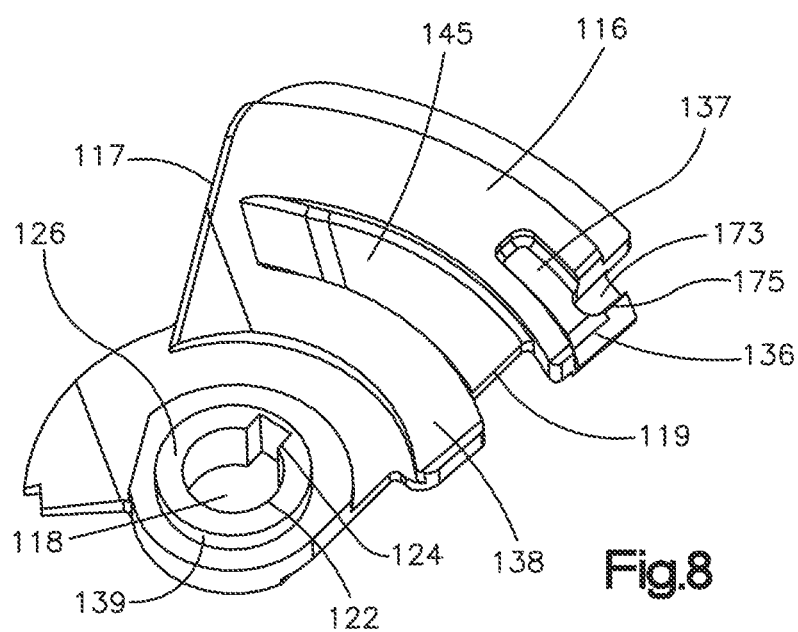
FIG. 8 is a bottom perspective view of the traveler of FIG. 1.

Referring to FIG. 8, the traveler 116 can include an opening 118 configured to receive the shaft 120. The traveler 116 can be rotationally fixed to the shaft 120 when the shaft 120 is in the opening 118. The opening 118 can be defined by a sidewall 122. The sidewall 122 can include a keyway 124 to receive a key to rotationally fix the traveler 116 to the shaft 120. In other examples, the shaft 120 can be rotationally fixed to the traveler 116 by the shape of the opening 118 and shaft 120, a fastener, adhesive, weld, or other common joining methods. In other examples the shaft 120 and traveler 116 are a monolithic construct. An outer surface 139 of the sidewall 122 can define a hub 126. The height of the hub 126 can be greater than a thickness of the body 128 of the gate 110. The outer surface 139 of the hub 126 can have a circular shape. In other examples, the outer surface 139 can have a rectangular, triangular, or other polygonal shape.

Referring to FIG. 7, the body 128 of the gate 110 can define a gate opening 130 sized and shaped to receive the hub 126. The hub 126 can be rotatable within the gate opening 130. The gate 110 can be rotatable relative to the traveler 116 when the hub 126 is within the gate opening 130. The hub 126 can be rotatable within the gate opening 130 such that the traveler 116 is movable relative to the gate 110 when the gate 110 is in the second position. In other examples, the gate 110 rotationally couples with the shaft 120 without receiving the hub 126. The gate 110 can be moveable relative to the hub 126 in the longitudinal direction L.

The traveler 116 can include a leading end 117 and a trailing end 119. The leading end 117 can be spaced from the trailing end 119 in the first traveler direction. The leading end 117 can engage and apply a force to the flap 129 as the traveler 116 moves in the first traveler direction from the first traveler position to the second traveler position.

The gate 110 can be mechanically coupled with the traveler 116 as the gate 110 moves from the first gate position to the second gate position. Referring to FIG. 7, the gate 110 can include a gate coupler 171 that couples to a traveler coupler 173 on the traveler 116 (FIG. 8). One of the gate coupler 171 and the traveler coupler 173 can be a protrusion and the other of the gate coupler 171 and the traveler coupler 173 can be a recess configured to receive the protrusion. The traveler coupler 173 can include a lip 175 that engages the gate coupler 171 that mechanically couples the traveler 116 with the gate 110. In other examples, at least one of the gate coupler 171 and the traveler coupler 173 can be a magnet such that the gate coupler 171 and the traveler coupler 173 are magnetically coupled. The gate 110 can be fixed relative to the traveler 116 when the gate coupler 171 is coupled with the traveler coupler 173. The gate coupler 171 and the traveler coupler 173 can be detachably coupled. One of the traveler 116 and the gate 110 can be movable relative to the other of the traveler 116 and the gate 110 when the gate coupler 171 is decoupled from the traveler coupler 173.

The gate 110 can be configured to stop in the second gate position as the traveler 116 continues to move in the first traveler direction. Referring to FIG. 7, the gate 110 can include a decoupling element 156 configured to at least partially decouple the gate 110 from the traveler 116. The decoupling element 156 can interact with the housing 102, 103 to decouple the gate 110 from the traveler 116. The decoupling element 156 can be a cantilevered beam that extends from the second end 123 of the body 128. In other examples, the decoupling element 156 can be a protrusion that extends from the second end of the body 128. At least a portion of the decoupling element 156 can be movable relative to the body 128 in the longitudinal direction L. The gate coupler 171 can be coupled with the decoupling element 156 such that the gate coupler 171 moves with the decoupling element 156. In some examples, the decoupling element 156 and the gate coupler 171 are a monolithic construct. The gate coupler 171 can decouple from the traveler coupler 173 as the decoupling element 156 moves in the longitudinal direction L.

Figure 9:
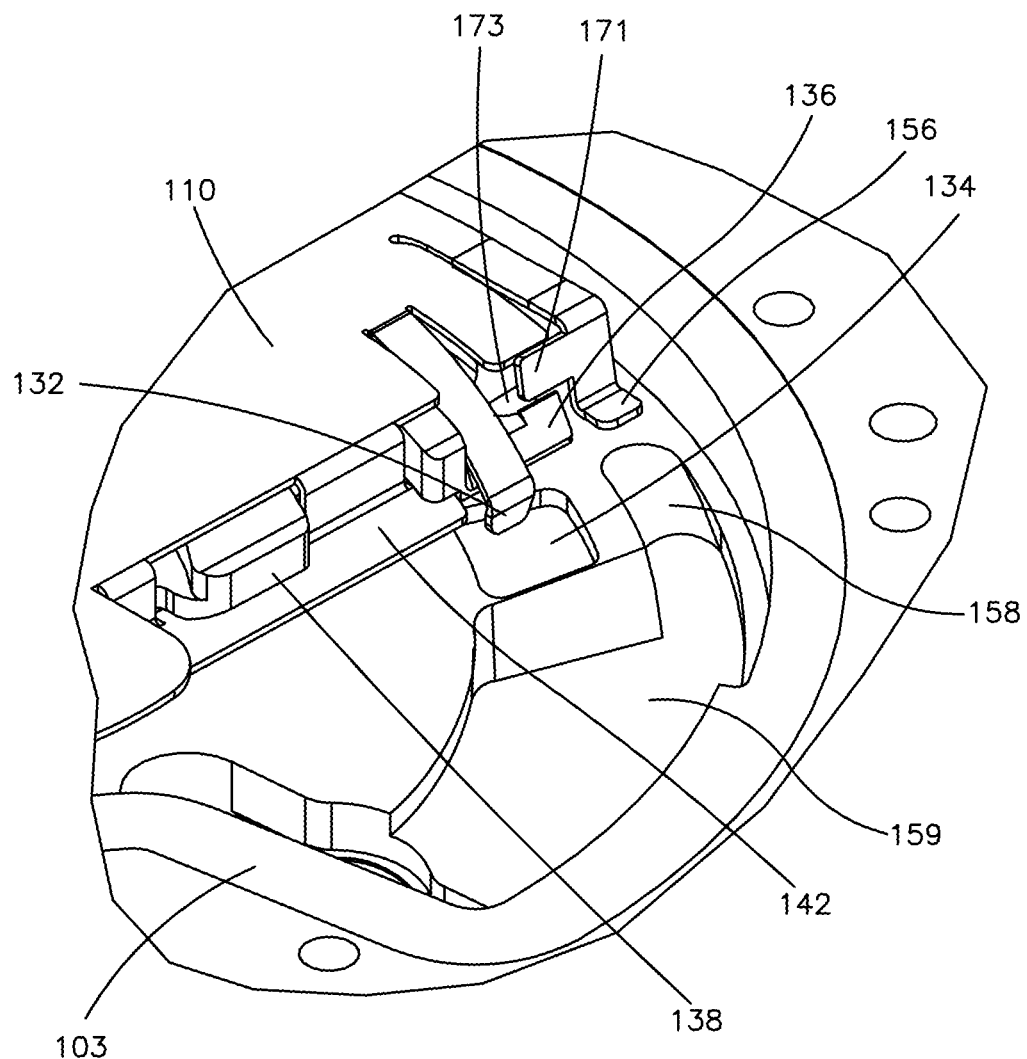
FIG. 9 is a bottom perspective view of the second housing member, the traveler, and the gate of FIG. 1 with the gate coupled with the housing just prior to engagement between the traveler and the gate.

Referring to FIG. 9, the second housing member 105 can include an engagement member 158. One of the decoupling element 156 and the engagement member 158 can be an inclined surface of the decoupling element 156 and the engagement member 158 can include a contact surface. The decoupling element 156 can move in the longitudinal direction L relative to the second housing member 105 in response to engagement of the inclined surface and the contact surface. The gate coupler 171 can disengage from the traveler coupler 173 in response to engagement of the inclined surface and the contact surface. The friction between the decoupling element 156 and the housing 102 can stop movement of the gate 110 in the first gate direction when the gate coupler 171 disengages from the traveler coupler 173. The gate 110 can be in the second gate position when the gate 110 disengages from the traveler 116. The gate 110 can be coupled with the housing 102 when the gate is in the third gate position. The gate 110 can be decoupled from the traveler 116 when the gate 110 is in the third gate position.

The gate 110 can engage the housing 102 to prevent movement of the gate 110 in the first gate direction. The gate 110 can include a catch 151 that engages a housing catch on the housing 102. One of the 151 and the housing catch can be a protrusion and the other of the catch 151 and the housing catch can be a protrusion or recess such that the gate is prevented from moving in the first gate direction when the catch 151 engages the housing catch. In some examples, the decoupling element 156 stops movement of the gate 110 in the first gate direction before the catch 151 engages the housing catch. In other examples, the decoupling element 156 slows movement of the gate 110 and the catch 151 stops movement of the gate 110 when the catch 151 engages the housing catch.

The second housing member 105 can include a trough 159 and at least a portion of the decoupling element 156 can be within the trough when the gate 110 is in the first gate position such that the gate coupler 171 is engaged with the traveler coupler 173. The decoupling element 156 can move out of the trough 159 as the gate 110 moves from the first gate position toward the second gate position. The decoupling element 156 can engage the engagement member 158 as the decoupling element 156 moves out of the trough.

The valve 100 can include features for coupling and decoupling the gate 110 and the traveler 116 other than the gate coupler 171 and the traveler coupler 173. In some examples, a biasing element can decouple the gate 110 from the traveler 116 when the gate 110 is in the second gate position. The biasing element can be a spring, torsion spring, piston in cylinder, compressible material such as rubber, or the like. In other examples, the gate 110 and the traveler 116 are coupled to separate shafts and the gate shaft rotation is less than the traveler shaft rotation. For example, the gate shaft can be coupled to the traveler shaft or shaft 120 by a sector gear such that the gate shaft rotates less than the traveler shaft. In other examples, one or more spring pins engage the gate 110 to couple or decouple the gate 110 from the traveler 116. For example, the spring pin can extend from the traveler 116 and engage the gate 110 such that the gate 110 and traveler 116 rotate in unison. The spring pin can retract when the gate 110 is in the second gate position such that the traveler 116 can rotate while the gate 110 remains in the second gate position. Alternatively, the spring pin can extend from the housing 102 such that the spring pin stops the gate 110 in the second gate position while allowing the traveler 116 to continue to rotate.

The traveler 116 can continue to move in the first traveler direction when the decoupling element 156 engages the housing 102. The traveler 116 can continue to rotate when the gate coupler 171 decouples from the traveler coupler 173. The gate 110 and the traveler 116 can move in unison between the first gate position and the second gate position while the traveler moves from the first traveler position toward the second traveler position. The traveler 116 can move relative to each of the housing 102 and the gate 110 as the traveler 116 moves toward the second traveler position when the gate 110 is in the second position.

The traveler 116 can apply a force to the flap 129 to move the flap 129 when the gate 110 is in the second gate position and the traveler 116 continues to move to the second traveler position. One of the flap 129 and the traveler 116 can include an inclined surface that engages the other of the flap 129 and the traveler 116 to move the flap 129 in the longitudinal direction L as the traveler 116 moves relative to the flap 129.

The flap 129 can move toward the opening 108 in response to movement of the traveler 116 relative to the flap 129. The traveler 116 can move the flap 129 from the second gate position (FIG. 5) to the third gate position (FIG. 6). The traveler 116 can move the gate 110 in the first gate direction from the first gate position to the second gate position. The traveler 116 can move the flap 129 in the second gate direction from the second gate position to the third gate position. In some examples, the flap 129 rotates relative to the body 128 in response to movement of the traveler 116 relative to the flap 129. In other examples, the flap 129 and body 128 move in the longitudinal direction L relative to the housing 102 as the traveler 116 moves relative to the flap 129.

Referring to FIG. 7, the gate 110 can include a stopper 132 configured to prevent movement of the gate 110 toward the first gate position. The stopper 132 can be a cantilevered beam that extends from the second end of the body 128. The stopper 132 can include a first end 131 and a second end 133.

The first end 131 can be coupled with second end of the body 128. The second end 133 of the stopper 132 can be a free end. The second end 133 can extend toward the second housing member 105 as the second end 133 extends away from the body 128. The stopper 132 can be configured to engage the housing 102. The stopper 132 can be configured to engage at least one of the first and second housing members 103, 105. In some examples, the second end 133 engages one of the first and second housing members 103, 105.

Referring to FIG. 9, the stopper 132 can be configured to engage an engagement feature 134 on the second housing member 105. In some examples, the second end 133 of the stopper 132 engages the engagement feature 134. The stopper 132 can engage the second housing member 105 when the flap 129 is in the third gate position. The flap 129 can be engaged with the first housing member 103 when the flap 129 is in the third gate position. The gate 110 can simultaneously engage each of the first and second housing members 103, 105 when the flap 129 is in the third gate position.

At least one of the stopper 132 and the engagement feature 134 can be a protrusion and the other of the stopper 132 and the engagement feature 134 can be a recess configured to receive the protrusion. The stopper 132 can be a latch. The stopper 132 and the flap 129 can each extend away from the body 128 in the longitudinal direction L. The stopper 132 can extend away from the body 128 in the longitudinal direction L by a distance that is greater than the height of the traveler 116. The stopper 132 and the flap 129 can each extend away from the body 128 toward the second housing member 105. The stopper 132 and the flap 129 can be disposed on opposing sides of the body 128 in the lateral direction A. The stopper 132 can be moveable relative to the body 128. The stopper 132 can be pivotable relative to the body 128. The body 128, the flap 129, and the stopper 132 can be a monolithic construct. The stopper 132 and the body 128 can be a monolithic construct. The stopper 132 can be coupled with the body 128 by a living hinge. The stopper 132 and the body 128 can be separate elements coupled with each other by a hinge.

The traveler 116 can move in the second traveler direction as the traveler moves from the second traveler position toward the first traveler position. The traveler 116 can be configured to engage and move the gate 110 from the third gate position to the first gate position as the traveler 116 moves in the second traveler direction. The stopper 132 can prevent movement of the gate 110 toward the first gate position while the stopper 132 is engaged with the engagement feature 134.

Referring to FIG. 9, the traveler 116 can include a decoupler 136 configured to disengage the stopper 132 from the engagement feature 134. The decoupler 136 can be coupled with the trailing end 119 of the traveler 116. One of the decoupler 136 and the stopper 132 can include a tapered edge or ramped surface such that the stopper 132 lifts in response to engagement between the stopper 132 and the decoupler 136. The stopper 132 can disengage from the engagement feature 134 as the traveler 116 moves from the second position to the first position. In other examples, the stopper 132 is biased away from the second housing member 105 such that the stopper moves away from the engagement feature 134 once the stopper 132 clears a feature on the first housing member 103. The decoupler 136 can move the stopper 132 toward the first housing member 103 as the traveler 116 moves in a second traveler direction opposite the first traveler direction. The traveler 116 can include a channel 137 to receive at least a portion of the stopper 132.

The stopper 132 can move out of the channel 137 as the traveler 116 moves in the first traveler direction.

The traveler coupler 173 and gate coupler 171 can be positioned to reengage as the traveler moves from the second traveler position toward the first traveler position. The traveler coupler 173 and gate coupler 171 can be positioned to reengage as the traveler moves in the second traveler direction before the stopper 132 disengages from the engagement feature 134.

The traveler 116 can move the gate 110 from the third gate position to the second gate position. The traveler 116 can move the gate 110 from the second gate position to the first gate position. The traveler 116 and the gate 110 can each include a trailing engagement feature that engage each other such that the traveler 116 moves the gate 110 in the second traveler direction. The traveler 116 can include a traveler trailing engagement feature 138 (FIG. 8) configured to engage a corresponding gate trailing engagement feature 140 (FIG. 7). In some examples, the traveler and gate trailing engagement features 138, 140 maintain engagement of the gate 110 and the traveler 116 to reduce or eliminate friction between the gate 110 and the housing 102. In some examples, the traveler and gate trailing engagement features 138, 140 are abutment surfaces that engage each other as the traveler 116 moves from the second traveler position to the first traveler position. In other examples, one of the traveler trailing engagement feature 138 and the gate trailing engagement feature 140 can be a recess and the other of the traveler trailing engagement feature 138 and the gate trailing engagement feature 140 can be a protrusion configured to be received within the recess. The traveler trailing engagement feature 138 can be a protrusion that extends from the trailing end 119 in the second traveler direction. The traveler trailing engagement feature 138 and the decoupler 136 can each extend from the trailing end 119 in the second traveler direction.

The gate trailing engagement feature 140 can be a recess configured to receive the traveler trailing engagement feature 138. Referring to FIG. 7, the recess can be defined by the body 128 and one or more sidewalls 141. The sidewalls 141 can extend from the body 128 in the longitudinal direction L. The sidewalls 141 can extend from the body 128 toward the second housing member 105. A base 142 can be coupled with the sidewalls 141 such that the traveler trailing engagement feature 138 prevents the gate body 128 from moving in the longitudinal direction L as the traveler 116 moves the stopper 132 in the longitudinal direction L. The base 142 can be positioned between the traveler trailing engagement feature 138 and the first housing member 103 when the traveler 116 moves in the second traveler direction. The traveler trailing engagement feature 138 can be positioned between the gate body 128 and the base 142 in the longitudinal direction L. The trailing end 119 can engage the sidewalls 141 so as to apply a force to the gate 110 to move the gate 110 in the second traveler direction. The traveler 116 can move the gate 110 from the third gate position to the first gate position as the traveler 116 moves in the second traveler direction.

The traveler trailing engagement feature 138 can engage with the gate trailing engagement feature 140 as the gate 110 moves from the second gate position to the first gate position. The traveler trailing engagement feature 138 can be disengaged from the gate trailing engagement feature 140 as the traveler reaches the second traveler position. The traveler trailing engagement feature 138 can reengage the gate trailing engagement feature 140 as the traveler 116 moves from the second traveler position toward the first traveler position. The gate trailing engagement feature 140 can be positioned between the gate opening 130 and the stopper 132 in a transverse direction T. The transverse direction T can be perpendicular to each of the lateral direction A and the longitudinal direction L.

In some examples, the flap 129 is biased toward the first configuration such that the flap 129 moves to the first configuration once the traveler 116 disengages from the flap 129. In other examples, the traveler 116 can move the flap 129 from the second configuration to the first configuration. Referring to FIG. 7, a tab 143 can be coupled with the flap 129 to facilitate movement of the flap 129 from the third gate position to the second gate position. The tab 143 can be generally parallel to the body 128 when the flap 129 is in the second gate position. The tab 143 can be disposed at an angle relative to the flap 129. An angle between a surface of the flap 129 and a surface of the tab 143 can be equal to the first angle. The tab 143 can move toward the first housing member 103 as the flap 129 rotates about the second axis $A_2$ as the traveler 116 moves in the first traveler direction. The tab 143 can move into a tab channel 145 (FIG. 8) in the traveler 116 as the traveler 116 moves in the second traveler direction. The tab channel 145 can be positioned between the hub 126 and the decoupler 136 in the transverse direction T. The tab 143 can engage a surface of the tab channel 145 as the traveler 116 moves in the second traveler direction. The inclined surface can cause the tab 143, and therefore the flap 129, to move in a fourth gate direction opposite the third gate direction. The fourth gate direction can be rotational about the second axis $A_2$. The flap 129 can move in the fourth gate direction as the flap 129 moves from the third gate position to the second gate position.

Referring back to FIG. 1, the valve 100 can include an actuator 144 configured to move the shaft 120. The actuator 144 can rotate the shaft 120 about the first axis $A_1$. The actuator 144 can be manually engageable. The actuator 144 can be a handle. A user can engage the actuator 144 and apply a force thereto to rotate the actuator 144 about the first axis $A_1$. In other examples, the actuator 144 can be a push button or lever. In still other examples, the actuator 144 can be a motor that rotates the shaft 120. The actuator 144 can be rotationally fixed relative to the shaft 120. The actuator 144 can rotate the shaft 120, thereby rotating the traveler 116. In some embodiments, contact between the tool 162 and the housing 102 and/or cover 107 can engage actuator 144. For example, the housing 102 and/or cover 107 can include a switch (e.g., a pressure plate or electric contact) that engages the tool 162 and causes the actuator 144 to reversibly open the valve 100 or shut the valve 100. In some embodiments, the actuator can include locking and/or retaining features to hold the tool 162 against a surface of the valve (e.g., an o-ring or other compliant surface) to reduce or eliminate the quantity of material that enters the valve 100 and/or the opening 108 while the actuator 144 is active. In this way, at least a portion of the operations of the valve 100 can be automated (e.g., undertaken without human intervention) or pseudo-automated (e.g., initiated with human intervention), as well as a manual process.

Referring to FIG. 1, the valve 100 can be detachably coupled with a tool 162 configured to introduce material into, or receive material from, the valve 100. The tool 162 can be at least temporarily locked to the valve 100. For example, the tool 162 can be locked to the valve 100 as the valve transitions from the closed configuration to the open configuration and back to the closed configuration. One of the tool 162 and the valve 100 can include a lock that locks the tool 162 with the valve 100. A cover 107 can be coupled with the housing 102. The cover 107 can include an opening that receives the tool 162. The cover 107 can include the lock. The lock can be a bayonet fitting. One of the cover 107 and the tool 162 can include a protrusion and the other of the cover 107 and the tool 162 can include a recess that receives the protrusion. The protrusion can be positioned in the recess in response to movement of the tool 162 relative to the cover 107. The protrusion within the recess can lock the tool 162 to the valve 100.

In some examples, the actuator 144 can lock the apparatus to the housing, activate the secondary outlet 160, and transition the gate 110 from the first gate position to the third gate position in a single actuation step. In other examples, locking the tool 162 to the housing 102 and transitioning the gate 110 can be separate steps. In other examples, multiple actuators can be used.

Figure 10:
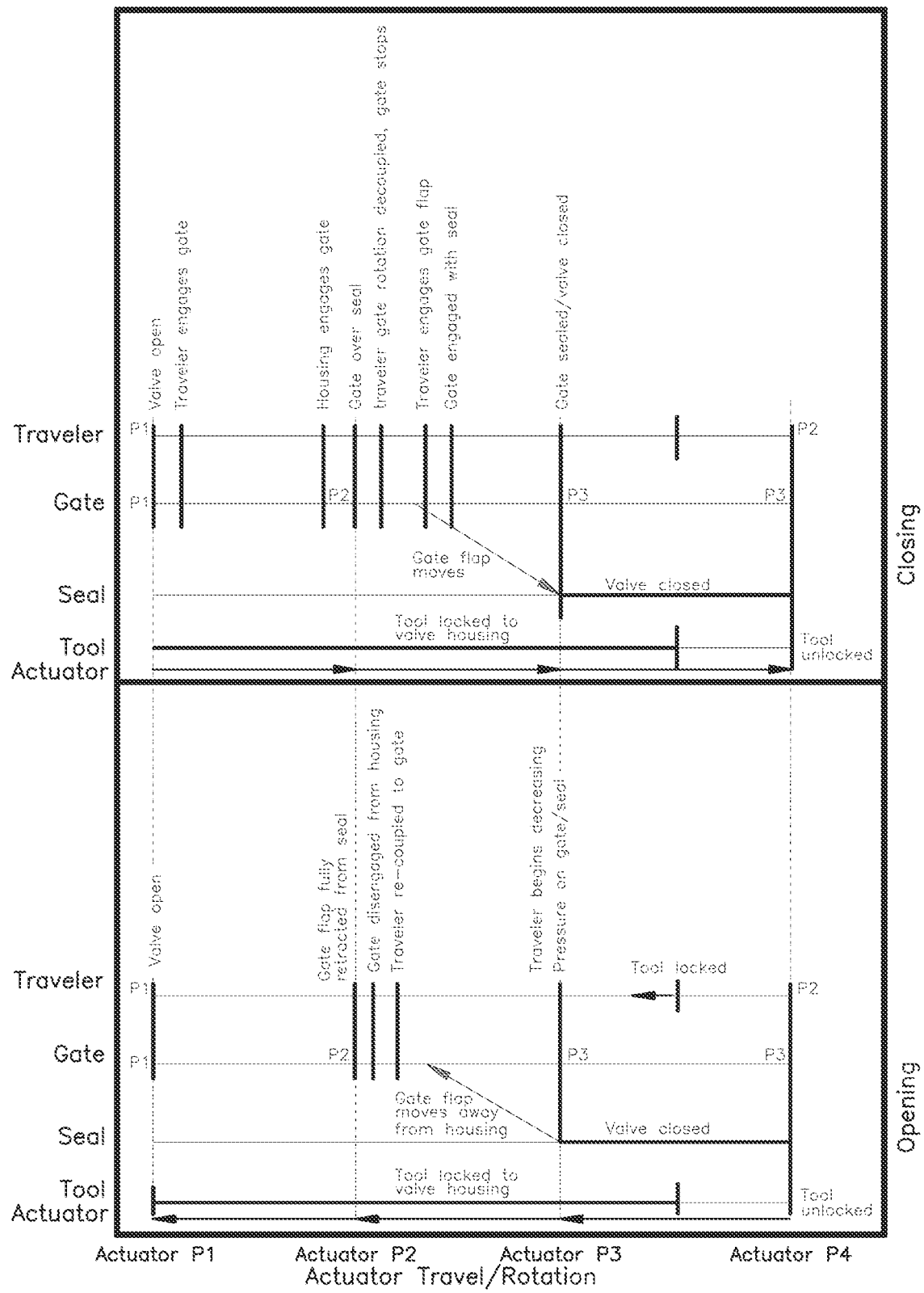
FIG. 10 is a schematic diagram illustrating movement of the components of the valve of FIG. 1.

FIG. 10 is a schematic illustration of relative movement between the gate 110, the traveler 116, and the housing 102. The valve 100 can be open when the actuator 144 is in a first actuator position. The traveler 116 can begin to move from the first traveler position toward the second traveler position as the actuator 144 moves from a first actuator position to a second actuator position. The traveler 116 can engage the gate 110 and move the gate 110 from the first gate position to the second gate position as the traveler 116 moves from the first traveler position toward the second traveler position. The gate 110 can engage the housing 102 as the gate moves toward the second gate position. At least a portion of the gate 110 can be positioned over the seal adjacent the opening 108 when the gate is in the second position. The gate 110 can be in the second position when the actuator 144 is in a second actuator position. The gate 110 can decouple from the traveler 116 when the gate 110 is in the second gate position such that the gate 110 stops and the traveler 116 continues to move toward the second traveler position.

The traveler 116 can engage the flap 129 after decoupling from the gate 110. The flap 129 can begin to move as the traveler 116 engages the flap 129. The gate 110 can engage the seal as the gate 110 moves toward the third gate position. The gate 110 can seal the opening 108 when the gate 110 is in the third gate position. The housing 102 can be engaged with the gate 110 when the gate is in the third gate position. The valve 100 can be closed when the gate 110 is in the third gate position. The actuator 144 can be in a third actuator position when the gate is in the third gate position. The tool 162 can be locked to the housing 102 as the actuator moves from the first actuator position to the third actuator position. The tool 162 can be unlocked as the actuator moves from the third actuator position to a fourth actuator position. The tool 162 can be disengageable from the housing 102 when the actuator 144 is in the fourth actuator position.

Moving the actuator 144 from the fourth actuator position to the third actuator position while the tool 162 is engaged with the housing 102 can begin an opening sequence for the valve 100. In some examples, tool 162 must be engaged with the housing to allow the actuator 144 to move from the fourth actuator position to the third actuator position. The tool 162 can be locked to the housing 102 as the actuator moves from the fourth actuator position to the third actuator position. The traveler 116 can move from the second traveler position toward the first traveler position as the actuator 144 moves from the fourth actuator position toward the third actuator position. The gate 110 can be in the third gate position as the actuator 144 moves from the fourth actuator position toward the third actuator position.

The traveler 116 can decrease pressure on the gate 110 as the actuator 144 moves from the third actuator position toward the second actuator position. The flap 129 can move away from the housing 102 as the actuator moves from the third actuator position toward the second actuator position. The opening can be unsealed as the flap 129 moves away from the housing 102. The traveler 116 can couple to the gate 110 as the traveler 116 moves toward the first traveler position. The gate 110 can disengage from the housing 102 as the gate 110 moves from the third gate position toward the second gate position. The gate 110 can be in the second gate position when the actuator 144 is in the second actuator position. The gate 110 and the traveler 116 can move toward their first positions as the actor moves to the first actuator position such that the valve 100 is open.

As discussed above, the housing 102 can define a cavity between the first housing member 103 and the second housing member 105. The valve 100 can be configured to purge material out of the cavity. In some examples, the valve 100 purges material from the cavity after the valve is closed. In other examples, the valve 100 purges material from the cavity prior to opening the valve 100. The valve 100 can be configured to reduce pressure within the cavity prior to opening the valve 100 so as to minimize or eliminate a surge of material from the cavity into a component with which the valve 100 is coupled. The valve 100 can include a secondary outlet 160 (FIG. 1) configured to purge the cavity of any material. The secondary outlet 160 can be a vacuum that removes any gas or fluid from the cavity. The secondary outlet 160 can introduce an inert gas into the cavity and then remove the inert gas from the cavity. The secondary outlet 160 can also reduce any pressure differential between the inlet and outlets of the valve 100. The secondary outlet 160 can be activated in response to movement of the actuator 144. The inlet of the valve 100 can be sealed prior to purging the cavity. The inlet can be sealed by a plug, apparatus, or by a second gate. The second gate can be the same as the gate 110. The traveler 116 can move the second gate into a sealed position as the traveler 116 moves the gate 110 from the first gate position to the third gate position. Opposing sides of the traveler 116 in the longitudinal direction L can be mirror images of each other to facilitate interaction of the traveler 116 with the second gate. The traveler 116 can simultaneously move the gate 110 and the second gate into sealed configurations.

It will be appreciated that the foregoing description provides examples of the disclosed system and method. However, it is contemplated that other implementations of the disclosure can differ in detail from the foregoing examples. For example, any of the embodiments disclosed herein can incorporate features disclosed with respect to any of the other embodiments disclosed herein. All references to the disclosure or examples thereof are intended to reference the particular example being discussed at that point and are not intended to imply any limitation as to the scope of the disclosure more generally.

As one of ordinary skill in the art will readily appreciate from that processes, machines, manufacture, composition of matter, means, methods, or steps, presently existing or later to be developed that perform substantially the same function or achieve substantially the same result as the corresponding embodiments described herein can be utilized according to the present disclosure.

What is claimed:

1. A valve comprising:
a housing including a first side and a second side opposite the first side, the housing including an opening such that material can pass through the opening from the first side to the second side;
a gate disposed within a cavity defined by the housing, the gate moveable relative to the housing in a first direction between a first gate position and a second gate position, at least a portion of the gate moveable relative to the housing in a second direction between the second gate position and a third gate position, the second direction different from the first direction, the gate allowing material passage through the opening in the first gate position and preventing material passage through the opening in the third gate position;
a shaft, rotatable relative to the housing; and
a traveler rotationally fixed to the shaft and disposed within the cavity, the traveler moveable relative to the housing from a first traveler position to a second traveler position, the traveler configured to move the gate in the first and second directions as the traveler moves from the first traveler position to the second traveler position, the traveler including an abutment surface to apply a force to an inclined surface of the gate to move the portion of the gate between the second gate position and the third gate position, the traveler including a trailing end and a leading end spaced from the trailing end in the first direction, wherein the leading end engages the inclined surface of the gate as the traveler moves in the first direction from the first traveler position to the second traveler position.

2. The valve of claim 1, wherein the gate rotates about a first gate axis as the gate moves in the first direction, and
wherein the portion of the gate is a gate flap, the gate flap coupled with a gate body and angularly displaceable relative to the gate body from a first gate flap position to a second gate flap position as the gate flap moves in the second direction.

3. The valve of claim 1, wherein at least one of the housing and the gate include a seal and the valve further comprises:
a seal engaged with the housing and the gate when the gate is in the third gate position such that the seal is disposed around at least a portion of the opening,
wherein the seal is disengaged from at least one of the gate and the housing as the gate moves from the first gate position to the second gate position.

4. The valve of claim 2, wherein the traveler rotates about a traveler axis as the traveler moves from the first traveler position to the second traveler position.

5. The valve of claim 2, wherein the gate body includes a first end and a second end spaced from the first end in a lateral direction,
wherein the gate flap extends from the gate body toward the traveler in a longitudinal direction different from the lateral direction so as to define a first angle between the gate body and the gate flap, and
wherein the abutment surface of the traveler engages the gate flap such that the gate is fixed relative to the traveler as the gate moves from the first gate position to the second gate position.

6. The valve of claim 1, further comprising:
a seal disposed about the shaft, the seal configured to permit purging the cavity.

7. The valve of claim 1, wherein the gate moves linearly as the gate moves from the first gate position to the second gate position.

8. The valve of claim 5, wherein the abutment surface applies a force to the gate flap in a force direction different from the first direction such that the gate flap moves between the second gate position and the third gate position so as to define a second angle between the gate flap and the gate body, the second angle different from the first angle.

9. The valve of claim 1, further comprising a shaft; and an actuator rotationally fixed to the shaft,
wherein the gate includes a gate shaft opening and the shaft is disposed in the gate shaft opening such that the gate is rotatable relative to the shaft,
wherein rotation of the actuator rotates the traveler.

10. The valve of claim 9, further comprising:
a secondary outlet configured to facilitate material movement into or from the cavity when the gate is in the third gate position.

11. The valve of claim 1, wherein one of the gate and the housing includes an inclined surface and the other of the gate and the housing includes a contact surface such that the gate moves relative to the housing in a third direction different from the first direction in response to engagement of the contact surface and the inclined surface.

12. An analytical instrument comprising:
a housing defining a cavity and an opening in communication with the cavity such that material can pass through the opening into or out of the cavity;
a shaft rotatable relative to the housing;
a gate disposed within the cavity, the gate moveable relative to the housing between a sealed position and an unsealed position, the gate allowing material passage through the opening in the unsealed position and preventing material passage through the opening in the sealed position;
a traveler rotationally fixed to the shaft and disposed within the cavity, the traveler including a trailing end and a leading end spaced from the trailing end in a first direction, wherein the leading end engages an inclined surface of the gate as the traveler moves in the first direction from a first traveler position to a second traveler position so as to move the gate from the unsealed position to the sealed position;
an apparatus configured to couple with the housing, the apparatus containing material such that material moves from the apparatus through the opening; and
an actuator rotationally fixed to the shaft such that the traveler moves from the first traveler position to the second traveler position in response to rotation of the actuator.

13. The analytical instrument of claim 12, wherein the gate is fixed relative to the traveler in the first direction as the gate moves from the unsealed position toward the sealed position.

14. The analytical instrument of claim 13, wherein one of the gate and the housing includes a protrusion and the other of the gate and the housing includes a recess such that the position of the gate is fixed relative to the housing when the protrusion is within the recess.

15. The analytical instrument of claim 14, wherein the traveler moves relative to each of the gate and the housing when the protrusion is within the recess.

16. The analytical instrument of claim 12, wherein the gate includes a gate body and a gate flap rotatably coupled with the gate body such that the gate flap rotates relative to the gate body from a first gate flap position to a second gate flap position as the gate moves from the unsealed position to the sealed position.

17. The analytical instrument of claim 16, wherein the gate includes an end wall transverse to the gate body and the trailing end of the traveler includes a trailing end abutment surface that engages the end wall so as to move the gate from the sealed position to the unsealed position as the traveler moves in a second direction opposite the first direction.

18. The analytical instrument of claim 12, further comprising:
a secondary outlet in fluid communication with the cavity, the secondary outlet configured to purge the cavity when the gate is in the sealed position.

19. The analytical instrument of claim 12, wherein rotation of the actuator couples the apparatus to the housing and moves the gate to the unsealed position.

20. The analytical instrument of claim 12, wherein the gate moves in a first gate direction from the unsealed position to the sealed position, and
wherein one of the housing and the gate include an inclined surface and the other of the housing and the gate include an engagement surface such that the gate moves relative to the housing in a longitudinal direction different from the first gate direction as the gate moves from the unsealed position to the sealed position.

* * * * *